United States Patent [19]

Yamanushi et al.

[11] Patent Number: 4,786,986
[45] Date of Patent: Nov. 22, 1988

[54] MAGNETIC RECORDING AND REPRODUCING APPARATUS

[75] Inventors: Fumihiko Yamanushi; Atsushi Yoshioka; Katsuyuki Watanabe; Michio Masuda, all of Katsuta; Kuniaki Miura, Ibaraki, all of Japan

[73] Assignee: Hitachi, Ltd., Tokyo, Japan

[21] Appl. No.: 113,603

[22] Filed: Oct. 28, 1987

[30] Foreign Application Priority Data

Oct. 31, 1986 [JP] Japan ................. 61-258251
Apr. 10, 1987 [JP] Japan ................. 62-86824

[51] Int. Cl.$^4$ .................................... H04N 5/78
[52] U.S. Cl. ................................. 360/33.1; 360/27
[58] Field of Search ............... 360/27, 28, 30, 33.1; 358/310, 330, 335

[56] References Cited

U.S. PATENT DOCUMENTS 4,613,912 9/1986 Shibata et al. ............... 358/343 X

Primary Examiner—Eugene R. LaRoche
Assistant Examiner—David Mis
Attorney, Agent, or Firm—Antonelli, Terry & Wands

[57] ABSTRACT

A magnetic recording and reproducing apparatus of a cassette type has a first and a second recording mode converting a luminance signal of a video signal into an FM luminance signal having a first and a second carrier frequency and recording the FM luminance signal on a magnetic tape respectively. When the FM luminance signal is to be recorded according to the second recording mode, a magnetic tape having an excellent short wavelength recording characteristic is used for recording. A cassette containing this magnetic tape is provided with a configurational feature on its upper or lower half, and a detector for detecting this feature is disposed in the apparatus. When the detector detects that a magnetic tape is adapted for recording according to the first recording mode, the FM luminance signal is recorded according to the first recording mode, but when the detector detects that the magnetic tape is adapted for recording according to the second recording mode, the user can select either the first recording mode or the second recording mode as desired. A discriminating circuit is disposed in the reproducing system to discriminate as to whether the FM luminance signal was recorded according to the first recording mode or the second recording mode, and, on the basis of the result of discrimination by the discriminating circuit, the reproduced FM luminance signal is automatically processed in a processing circuit with a processing characteristic corresponding to the recording mode.

10 Claims, 10 Drawing Sheets

FIG. 11

| MAGNETIC TAPE | RECORD | | REPRODUCE | |
|---|---|---|---|---|
| | RECORDING VTR | RECORDING METHOD | REPRODUCING VTR | REPRODUCED SIGNAL |
| HIGH BAND | H | H | H | H |
| | | | C | — |
| | | C | H | C |
| | | | C | C |
| | C | C | H | C |
| | | | C | C |
| CONVENTIONAL | H | C | H | C |
| | | | C | C |
| | C | C | H | C |
| | | | C | C |

( H : HIGH BAND, C : CONVENTIONAL )

ic recording and reproducing apparatus (referred to hereinafter as a VTR), and more particularly to a VTR having a plurality of standard recording modes for recording a luminance signal of a video signal.

MAGNETIC RECORDING AND REPRODUCING APPARATUS

BACKGROUND OF THE INVENTION

This invention relates to a magnetic recording and reproducing apparatus (referred to hereinafter as a VTR), and more particularly to a VTR having a plurality of standard recording modes for recording a luminance signal of a video signal.

In recording a video signal on a magnetic tape in a VTR widely used now in homes, its luminance signal is converted into an FM luminance signal, and the frequency band of its chrominance signal is converted into a low frequency band. For example, in the case of recording a video signal on a magnetic tape according to standards of a VTR of VHS system, its luminance signal is converted into an FM luminance signal having a carrier frequency of 3.4 MHz to 4.4 MHz, and its chrominance signal is subjected to low frequency band conversion of from 3.58 MHz to 0.629 MHz. Therefore, the transmission band of the luminance signal is about 3 MHz, and the horizontal resolution is about 240 lines.

Means for improving the horizontal resolution thereby improving the picture quality is reported in a paper entitled "½ High Band VTR" in the Journal of the Institute of Television Engineers of Japan, May, 1986, pp. 36–39. This paper proposes a high band recording method in which the carrier frequency of a luminance signal is shifted toward a higher frequency range. Since the carrier frequency of the luminance signal is shifted toward the higher frequency range according to the proposed method, it is necessary to partly modify the operating characteristic of a luminance signal processing circuit. In order that a single VTR can record and reproduce a video signal according to both of a conventional method and a high band method, part of its luminance signal processing circuit is changed over by a manual switch manipulated by the hand of the user depending on the recording method.

It has thus been a prior art practice that, in a playback mode, the user manipulates the manual switch to change over the luminance signal processing circuit according to the method of recording the video signal to be reproduced, and the visual decision of the user observing the screen of a monitor is based to identify the recording method. That is, the changeover of the luminance signal processing circuit in the playback mode has not been automated, resulting in troublesome handling.

Further, the application of the high band recording method to the VTR requires a magnetic tape capable of recording a signal having a frequency higher than hitherto, that is, a signal having a short wavelength. At the present level of trial manufacture, means for coating magnetic powder at a high density or like means is utilized to produce a magnetic tape capable of recording a high band higher by about 1 MHz to 2 MHz than the usual frequency band.

In the prior art VTR described above, application of the high band recording method to recording a video signal on a new type of magnetic tape adapted for exclusive service of high band recording has not been taken into consideration, and there have been problems in regard to the discrimination between a magnetic tape used for high band recording and a magnetic tape used for conventional recording and also in regard to the compatibility between the high band recording method and the conventional recording method.

SUMMARY OF THE INVENTION

It is an object of the present invention to provide effective means for use in a VTR capable of recording and reproducing a video signal according to both of the conventional method and the high band method, so that the recording method can be automatically identified in the playback mode, and the identification can be reliably made without fail irrespective of the operating condition of the VTR.

Another object of the present invention is to realize a system capable of automatically discriminating between a magnetic tape used for high band recording and a magnetic tape used for conventional recording in a VTR adapted for recording and reproducing a video signal according to the high band method, to permit recording the video signal according to both of the high band recording method and the conventional recording method in the record mode by changing over the VTR's signal recording system, and to provide effective means for automatically discriminating, in the playback mode, between a record provided by the high band recording method and a record provided by the conventional recording method, thereby improving the picture quality owing to the application of the high band recording method while ensuring the unidirectional or one-way compatibility.

The VTR of the present invention which attains the above objects comprises a discriminating circuit which is disposed in a reproducing system to discriminate the recording method on the basis of a reproduced FM signal before the signal is applied to a reproduced FM luminance signal processing circuit whose operating characteristic is changed over depending on the recording method, especially, before the signal is applied to a reproduced FM signal peaking circuit. The signal used for discrimination in the discriminating circuit may be an output signal of an FM automatic gain control circuit (referred to hereinafter as an FMAGC circuit). Also, a signal such as a head-drum rotation phase signal may be used to determine the timing of discrimination. In the present invention, the result of discrimination by the discriminating circuit is based to change over the operating characteristic of the reproduced luminance signal processing circuit. Preferably, the discriminating circuit discriminates the recording method by detecting the frequency of its input signal.

Also, in the VTR of the present invention, a magnetic tape capable of recording short wavelengths and having an excellent characteristic for recording and reproducing a high frequency signal is used for the high band recording purpose. The upper or lower half of a cassette containing such a magnetic tape used for the high band recording purpose is provided with a configurational feature such as a hole, a groove or a projection which is not provided on the upper or lower half of a conventional cassette. The VTR comprises a circuit which can detect such a configurational feature of the cassette containing the high-band recording magnetic tape.

Further, the VTR of the present invention comprises a switch which is manipulated by the user for selecting the high band recording or the conventional recording in the record mode, so that, when the output of the feature detecting circuit indicates that the magnetic tape for high band recording purpose is contained in the cassette, either the high band recording or the conventional recording can be selected as desired, while when loading of the conventional magnetic tape in the cassette is detected, the conventional recording can be done regardless of the position of the switch.

As described above, the discriminating circuit discriminates the recording method on the basis of a reproduced FM signal before the FM signal is applied to the reproduced luminance signal processing circuit whose operating characteristic is changed over depending on the recording method used in the record mode. Therefore, the discriminating circuit can reliably identify the recording method even in a starting stage of the reproducing operation or even when the recording method is changed during signal recording on the magnetic tape. Also, when the recording method is discriminated on the basis of the reproduced FM signal having passed through the FMAGC circuit, the recording method can be reliably identified regardless of possible variations in the level of the FM signal reproduced by a magnetic head from the magnetic tape. Further, when the timing of discrimination is determined on the basis of the head-drum rotation phase signal, the recording method can be reliably discriminated even in a special playback mode such as a search mode.

Further, when the magnetic tape having the excellent short wavelength recording characteristic is used for the purpose of high band recording, attenuation of high frequency components in a recorded video signal decreases to permit the desired high band recording. It is apparent that a video signal can be recorded on the high-band recording magnetic tape according to the conventional recording method.

In the present invention, a configurational feature as described above is provided on the upper or lower half of the cassette containing the high-band recording magnetic tape. Therefore, when a feature detecting circuit as described above is provided in the high-band recording VTR, the magnetic tape can be automatically discriminated from a conventional magnetic tape.

Further, when a select switch which can be manipulated by the user depending on the high band recording or the conventional recording is provided as described above and cooperates with the cassette-half feature detecting circuit, a video signal can be recorded on the high-band recording magnetic tape according to the recording method desired by the user. This combination also prevents accidental recording of a video signal on a conventional magnetic tape by the high band recording method. Also, by additional provision of a frequency discriminating circuit which discriminates the frequency of a reproduced signal, whether the video signal is recorded on a magnetic tape according to the high band recording method or the conventional recording method can be automatically identified.

BRIEF DESCRIPTION OF THE DRAWINGS

FIG. 11 is a table illustrating the recording operation, reproducing operation, etc. of the VTR of the present invention.

DESCRIPTION OF THE PREFERRED EMBODIMENTS

Preferred embodiments of the present invention will now be described in detail with reference to the accompanying drawings.

Figure 2A:
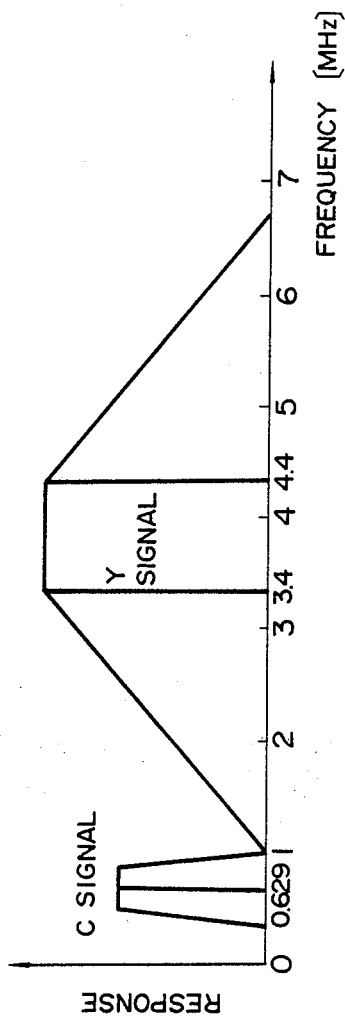
FIGS. 2A and 2B are graphs showing frequency allocations of a video signal recorded by the conventional method and the high band method in VTR's of VHS system respectively.
Figure 2B:
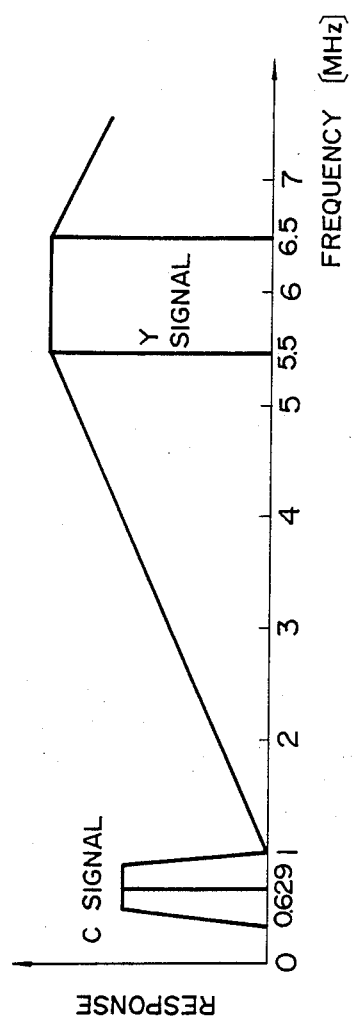

FIGS. 2A and 2B show frequency allocations of a video signal recorded on a manetic tape. FIG. 2A represents the standards of the frequency allocation of the conventional VHS system. According to the conventional VHS system, a luminance signal (a Y signal) is converted into an FM luminance signal having a carrier frequency of 3.4 MHz to 4.4 MHz, and the frequency of the subcarrier of a chrominance signal is low-band converted from 3.58 MHz to 0.629 MHz. Thus, the frequency band of the Y signal is about 3 MHz. In a VTR to which the present invention is applied, a video signal is also recorded and reproduced according to new high band standards in which another carrier wave of its Y signal has a frequency of, for example, 5.5 MHz to 6.5 MHz. However, the frequency of the subcarrier of its C signal is low-band converted in a manner similar to the conventional VHS system, as shown in FIG. 2B. By the use of this high band recording method, the low frequency range of the Y signal is widened by about 2 MHz, and the horizontal resolution can be improved by about 160 lines. However, when the high band recording method, which widens the low frequency range of the Y signal by about 2 MHz, is applied to a conventional magnetic tape which is difficult to record short wavelengths, great attenuation occurs in high frequency components of a reproduced signal. Therefore, it is preferable to use a high-band recording magnetic tape which can record short wavelengths. An example of such a magnetic tape is an evaporated tape or a metal tape.

Figure 3:
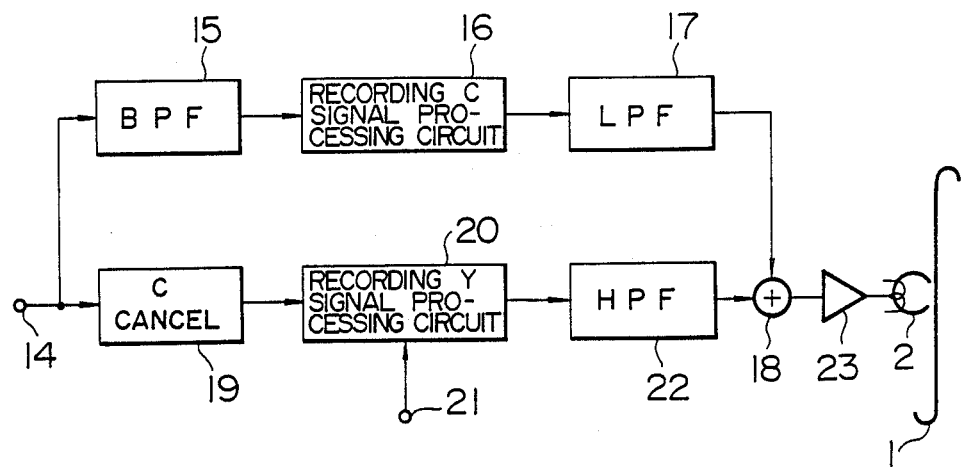
FIG. 3 is a block diagram showing the structure of one form of a recording system used in the VTR of the present invention.

FIG. 3 is a block diagram showing the structure of one form of a recording system incorporated in a preferred embodiment of the VTR according to the present invention. An NTSC video signal is applied to an input terminal 14, and its C signal component only is extracted in a band-pass filter (BPF) 15. The extracted C signal has its low frequency band converted in a recording C signal processing circuit 16, and the output signal of the signal processing circuit 16 is applied to an adder 18 after its unnecessary high frequency components are removed in a low-pass filter (LPF) 17. The NTSC video signal from the input terminal 14 is applied also to a C signal cancelling circuit 19 in which its Y signal only is extracted, and the extracted Y signal is applied to a recording Y signal processing circuit 20 in which the Y signal is converted into an FM Y signal. The output signal of the signal processing circuit 20 is applied to a high-pass filter (HPF) 22 where frequency components overlapping those of the lowfrequency-band converted C signal are removed, and the resultant signal is applied to the adder 18. In the adder 18, the Y signal and the C signal are frequency multiplexed, and the resultant video signal is applied through a recording amplifier 23 to a magnetic head 2 to be recorded on a magnetic tape 1. The recording Y signal processing circuit 20 includes a low-pass filter, a pre-emphasis circuit, an FM modulation circuit, etc., and the characteristics of such ciruits are changed over by a select signal applied to an input terminal 21 from a recording method select switch manipulated by the user, so that the conventional recording method or the high band recording method is selected as desired by the user.

Figure 1:
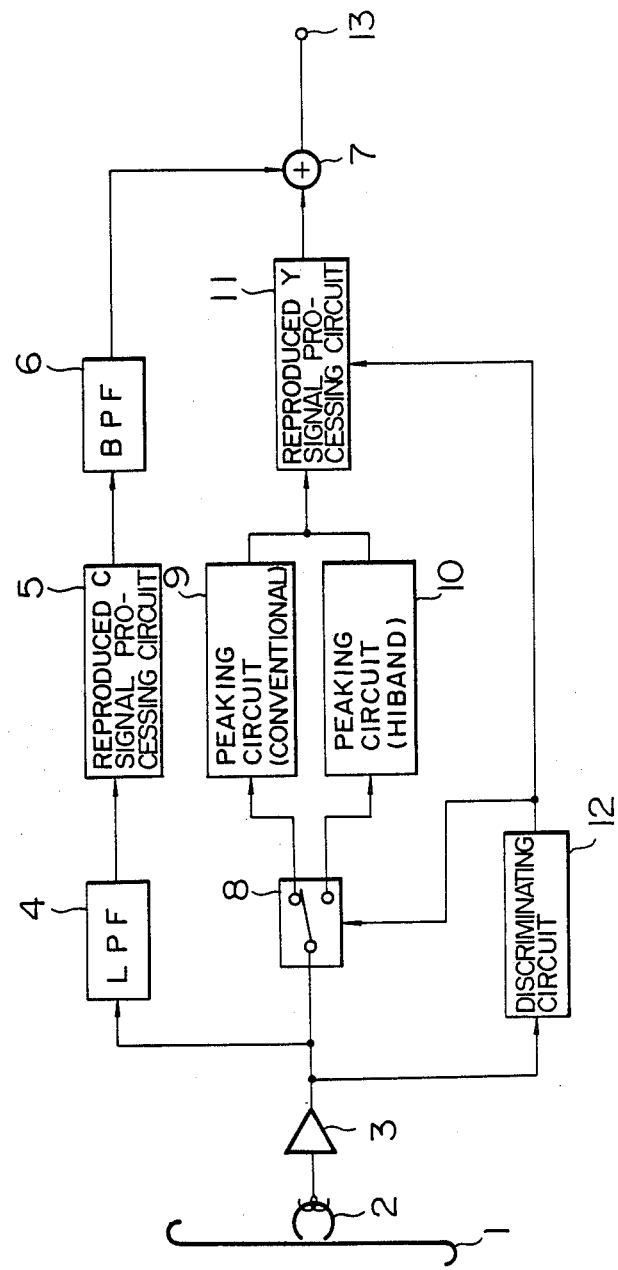
FIG. 1 is a block diagram showing the structure of one form of a reproducing system used in a preferred embodiment of the VTR according to the present invention.

FIG. 1 is a block circuit diagram showing the structure of one form of a reproducing system for reproducing the video signal recorded by the recording system shown in FIG. 3.

The video signal read out from the magnetic tape 1 by the magnetic head 2 passes through a preamplifier 3 to be applied to each of an LPF 4, a switch 8 and a discriminating circuit 12. In the LPF 4, the C signal component only is extracted from the video signal, and the frequency of the subcarrier is restored to the original frequency of 3.58 MHz in a reproduced C signal processing circuit 5. The output signal of the signal processing circuit 5 is applied to an adder 7 after its unnecessary frequency components are removed in a BPF 6. Whether the reproduced video signal was recorded according to the conventional recording method or the high band recording method is identified on the basis of the output of the discriminating circuit 12 as described later. When the video signal was recorded according to the conventional recording method, the reproduced video signal is applied through the switch 8 to a peaking circuit 9 having a frequency characteristic, for example, as shown by a characteristic curve 24 in FIG. 4. On the other hand, when the video signal was recorded according to the high band recording method, the reproduced video signal is applied through the switch 8 to a peaking circuit 10 having a frequency characteristic, for example, as shown by a characteristic curve 25 in FIG. 4. The output signal of the peaking circuit 9 or 10 is applied to a reproduced Y signal processing circuit 11, and the output signal of the signal processing circuit 11 is applied to the adder 7. In the adder 7, the Y signal and the aforementioned C signal are frequency multiplexed, and the original NTSC video signal appears at an output terminal 13. The reproduced Y signal processing circuit 11 includes an FM demodulation circuit, a de-emphasis circuit, etc., and the characteristics of such circuits are also changed over according to the output of the discriminating circuit 12 which discriminates the method of recording the reproduced video signal.

As described above, the recording method of the reproduced video signal is identified on the basis of the output of the discriminating circuit 12, and a signal indicative of the result of identification is applied to both of the switch 8 and the reproduced Y signal processing circuit 11, so that the operating characteristic of the signal processing circuit 11 in the reproducing system can be automatically changed over to match the method of recording in the recording system.

Figure 4:
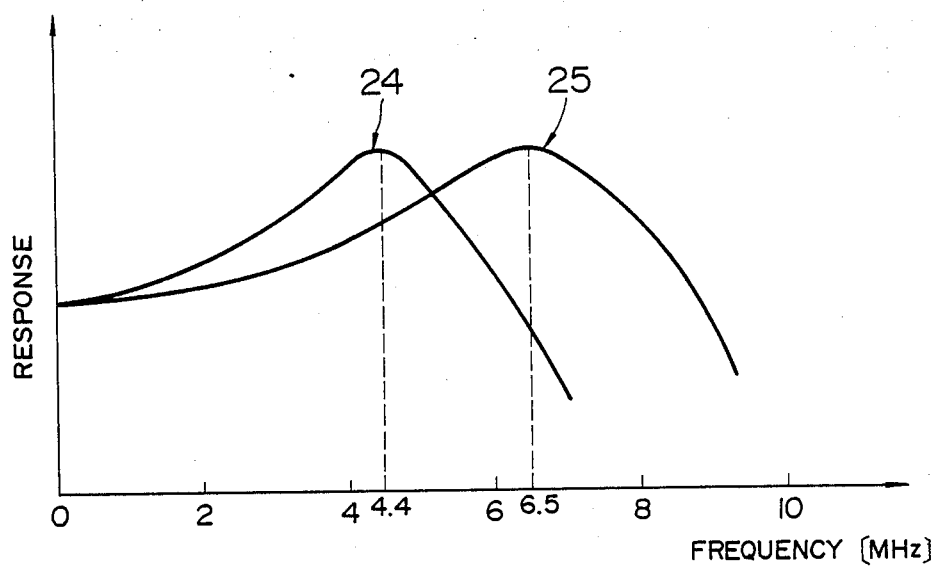
FIG. 4 is a graph showing the characteristics of the conventional and high band peaking circuits respectively used in the VTR of the present invention.

The reason why the reproduced video signal before being passed through the peaking circuit 9 or 10 is used for identification of the recording method will now be described. Each of the peaking circuits 9 and 10 acts as an FM equalizer compensating the low-band emphasis and high-band suppression transmission characteristics attributable to the tape-head system and has an operating characteristic for emphasizing a frequency range close to the highest frequency of the FM carrier wave and suppressing the lower sideband, as shown in FIG. 4. Therefore, the peaking circuit 10 used in the reproducing system shown in FIG. 1 has its peaking center frequency biased by about 2 MHz toward the higher frequency side as compared to that of the peaking circuit 9. Suppose, for example, that the input signal of the reproduced Y signal processing circuit 11, that is, the output signal of the peaking circuit 9 or 10 is used for the identification of the recording method. Suppose then that the video signal recorded by the high band recording method is reproduced when the switch 8 is in the position shown in FIG. 1 in the starting stage of reproduction. In such a case, the input signal of the reproduced Y signal processing circuit 11 is such that the lower sideband component having the frequency lower by about 2 MHz than that of the carrier wave is excessively emphasized relative to the carrier wave. As a result, the discriminating circuit 12 will decide that this lower sideband component is the carrier wave and will misjudge that the reproduced video signal was recorded according to the conventional recording method. Similar misjudgment will occur when the recording method is changed from the conventional method to the high band method during recording the video signal on the magnetic tape 1. In order to prevent such misjudgment by the discriminating circuit 12, the reproduced video signal before being applied to the peaking circuit 9 or 10 is used in the present invention for the identification of the recording method, as shown in FIG. 1. Thus, the recording method can be reliably identified without fail irrespective of the operating conditions of the peaking circuits 9, 10 and reproduced Y signal processing circuit 11 in the reproducing system.

Figure 5:
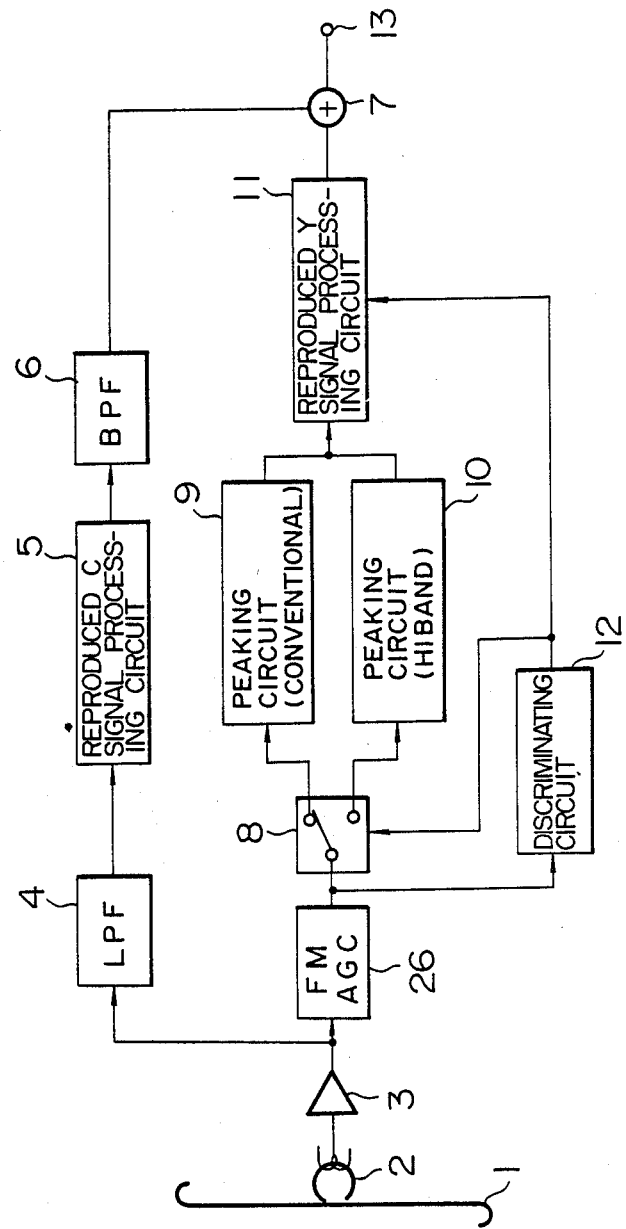
FIG. 5 is a block diagram showing the structure of another form of the reproducing system used in the VTR of the present invention.

Another form of the reproducing system employed in the VTR of the present invention is shown in FIG. 5. In FIG. 5, an output signal of an FMAGC circuit 26 is applied to the discriminating circuit 12. Referring to FIG. 5, the video signal read out from the magnetic tape 1 by the magnetic head 2 is directly applied to the LPF 4 after being amplified by the preamplifier 3 as in the case of the reproducing system shown in FIG. 1. On the other hand, the reproduced video signal is applied to both the switch 8 and the discriminating circuit 12 after its amplitude is fixed in the FMAGC circuit 26. Therefore, even when the sensitivity of the magnetic tape 1 and that of the magnetic head 2 may change to change the amplitude of the reproduced video signal, an input signal having a fixed amplitude can be applied to the discriminating circuit 12, so that the recording method can be reliably identified without fail.

Figure 6:
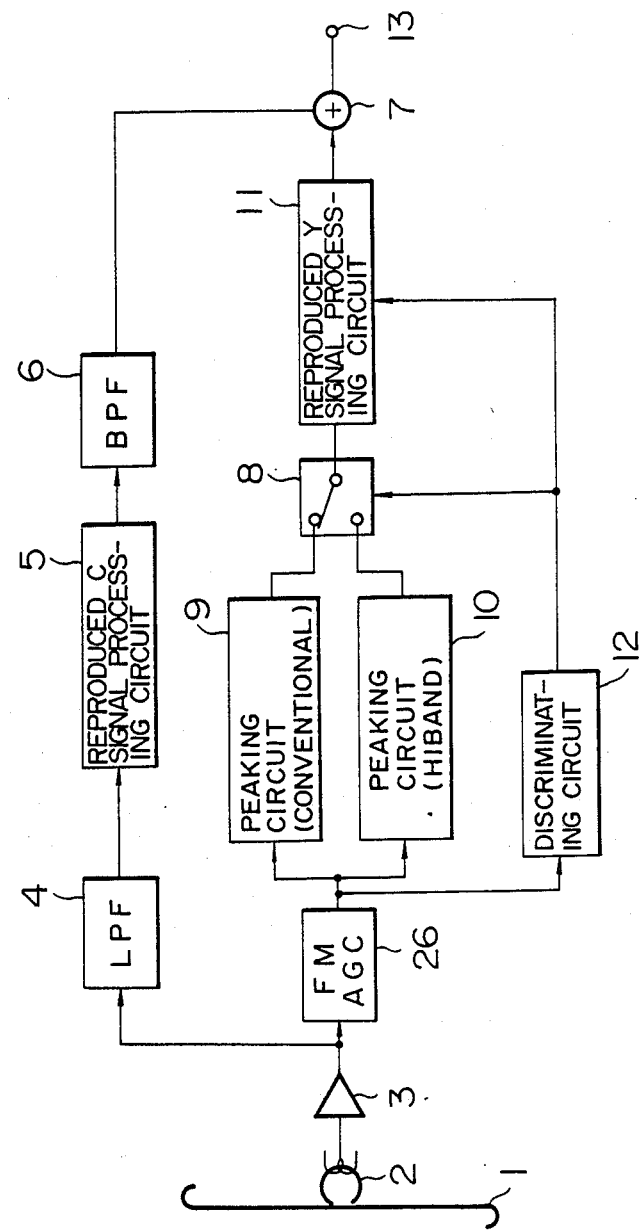
FIG. 6 is a block diagram showing the structure of still another form of the reproducing system used in the VTR of the present invention.

In the forms of the reproducing system shown in FIGS. 1 and 5, the input to the peaking circuit 9 or 10 is changed over by the switch 8. FIG. 6 shows a modification of the reproducing system shown in FIG. 5. In FIG. 6, the output of the peaking circuit 9 or 10 is changed over by the switch 8. In a modification, both of the input and the output of the peaking circuit 9 or 10 may be changed over.

Figure 7:
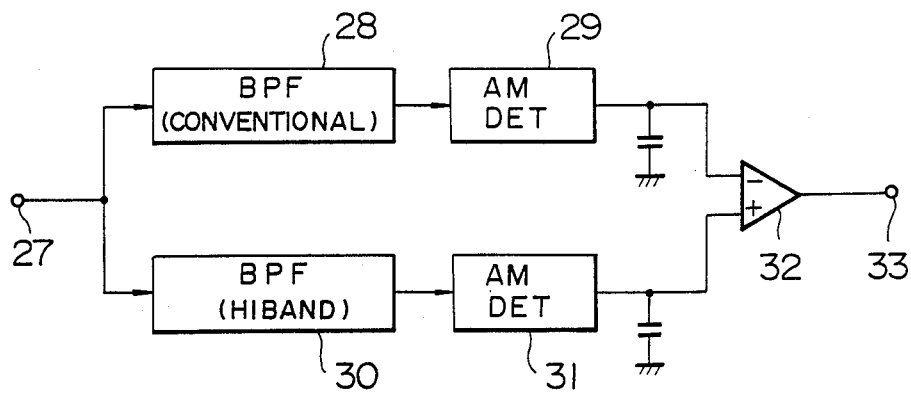
FIG. 7 is a circuit diagram of one form of the discriminating circuit included in the reproducing system used in the VTR of the present invention.

FIG. 7 is a block circuit diagram showing the detailed structure of one form of the discriminating circuit 12. Referring to FIG. 7, the reproduced video signal is applied from an input terminal 27 to both of a BPF 28 and a BPF 30. These BPFs 28 and 30 extract frequency ranges close to the frequencies of the carrier waves of the FM luminance signal of the video signal recorded according to the conventional recording method and the high band recording method respectively. The output signals of the BPFs 28 and 30 are applied to signal level detecting circuits (referred to hereinafter as AMDET's) 29 and 31 respectively. Each of these AMDETs 29 and 31 generates a detected voltage proportional to the signal level passed through the associated BPF. The output signals of the AMDETs 29 and 31 are applied to a comparator 32. An output signal of high level appears at an output terminal 33 of the discriminating circuit 12 when the reproduced video signal was recorded according to the high band recording method, while an output signal of low level appears at the output terminal 33 when the reproduced video signal was recorded according to the conventional recording method. Such an output signal of the discriminating circuit 12 is applied to both the switch 8 and the reproduced Y signal processing circuit 11.

Figure 8:
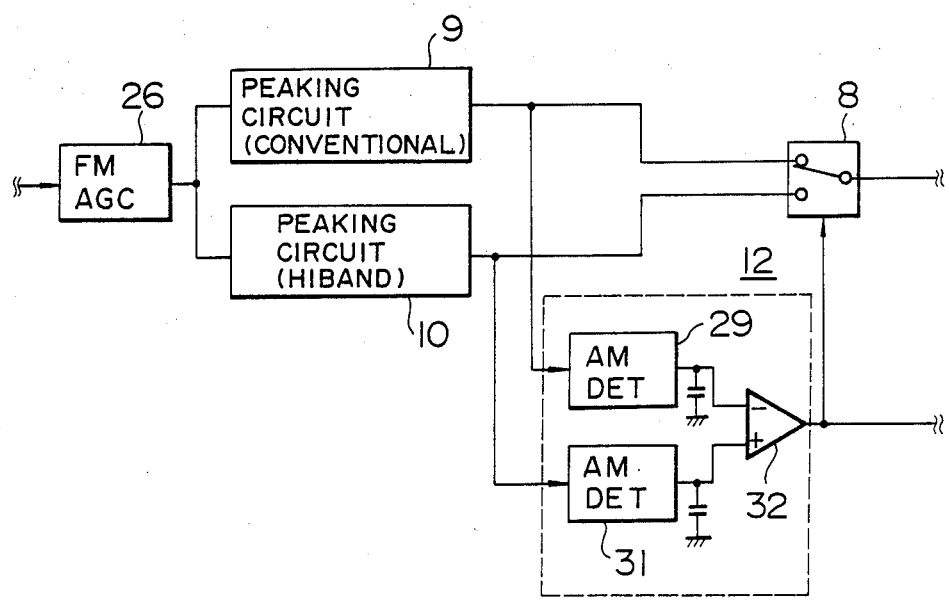
FIGS. 8, 9 and 10 are circuit diagrams of other forms of the discriminating circuit included in the reproducing system used in the VTR of the present invention.

In the form of the reproducing system shown in FIG. 6, the switch 8 is disposed in a stage succeeding the peaking circuits 9 and 10. Therefore, the discriminating circuit 12 may be constructed as shown in a block circuit diagram of FIG. 8. Even in such a case, the function of the discriminating circuit 12 is similar to that described hereinbefore. In FIG. 8, the functions of the BPFs 28 and 30 in the discriminating circuit 12 shown in FIG. 7 are substituted by the peaking circuits 9 and 10 respectively. Thus, the structure of the discriminating circuit 12 can be simplified.

Figure 9:
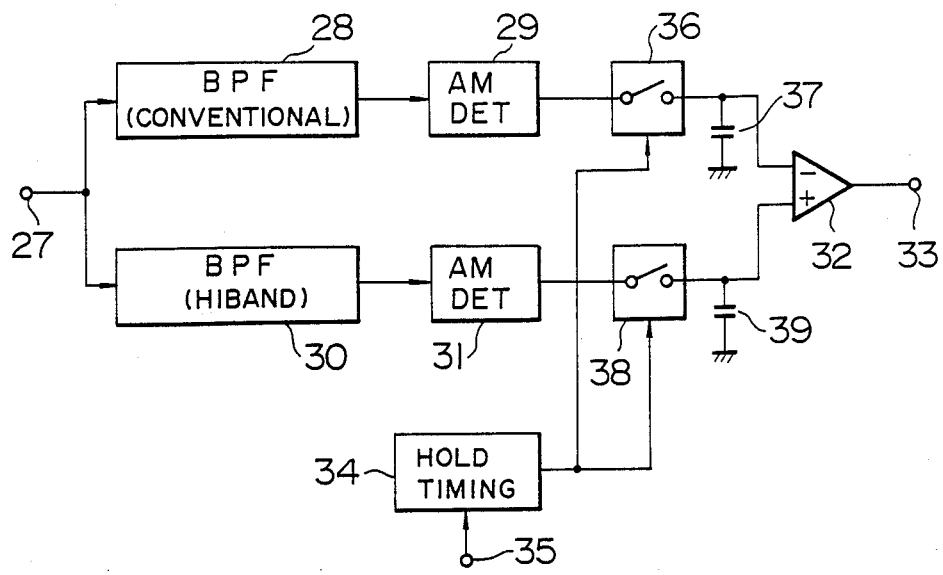

FIG. 9 shows another form of the discriminating circuit 12 in which means are provided to prevent maloperation. Referring to FIG. 9, a hold timing circuit 34 generates a control signal which maintains switches 36 and 38 in their on-state for a vertical or horizontal synchronizing period only on the basis of a head-drum rotation phase signal (referred to hereinafter as a SW30 signal) or a horizontal synchronizing signal applied to its input terminal 35. Thus, the output voltages of the AMDETs 29 and 31 are held for the vertical or horizontal synchronizing period in capacitors 37 and 39 connected to the outputs of the switches 36 and 38 respectively. Therefore, the recording method can be reliably identified without being affected by the picture contents of the video signal.

In the case of a search (high-speed reproduction) for a magnetic tape having a video signal recorded according to guard band recording, the hold timing circuit 34 generates, on the basis of the SW30 signal, a control signal to maintain the switches 36 and 38 in their off-state during a noise band period in one field of the video signal. By so maintaining the switches 36 and 38 in their off-state during the noise band period, maloperation (for example, chattering) of the control circuit in the noise band period during the search can be prevented.

Figure 10:
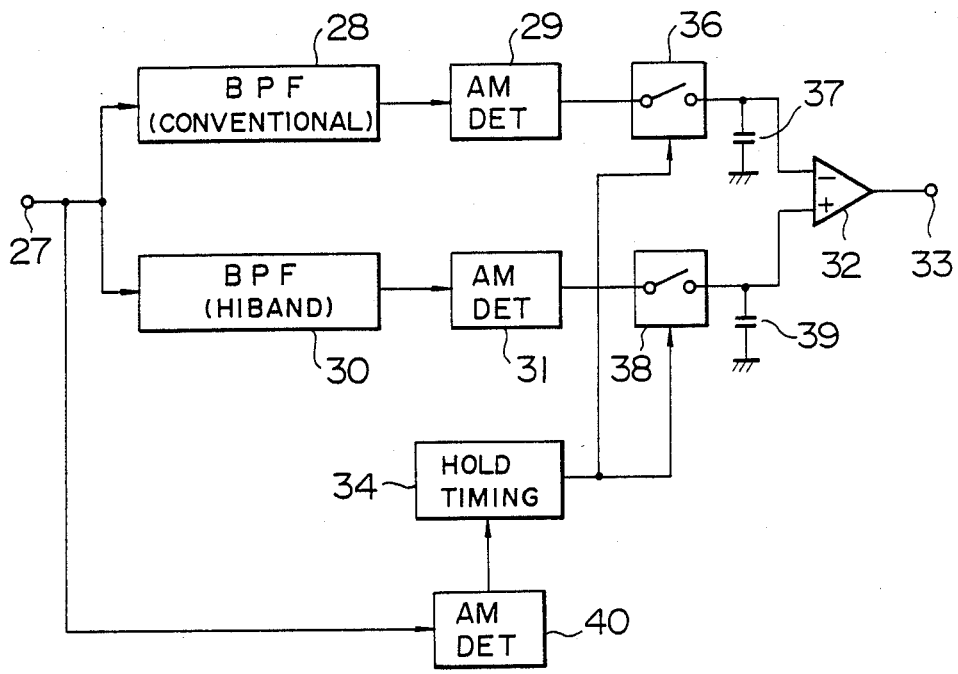

FIG. 10 shows a modification of the discriminating circuit shown in FIG. 9. The modification shown in FIG. 10 can also prevent maloperation of the control circuit in a noise band period during a search. Referring to FIG. 10, the amplitude of the reproduced video signal applied to the input terminal 27 is attenuated approximately to a noise level in a noise band period during a search. An AMDET 40 generates a detected voltage proportional to the amplitude of the reproduced video signal, and the hold timing circuit 34 detects the noise band period on the basis of the level of the detected voltage and generates a control signal to maintain the switches 36 and 38 in their off-state in the noise band period. Thus, even in the noise band period, the capacitors 37 and 39 hold the voltages detected by the respective AMDETs 29 and 31 immediately before the noise band period starts, thereby preventing maloperation of the control circuit. In the form shown in FIG. 10, maloperation of the control circuit can be prevented even when the noise band period in one field of the video signal is not fixed during the search.

The recording system will be discussed again by referring to FIG. 11. As will be apparent from FIG. 11, the high band recording can be made only when a high-band recording magnetic tape is used for picture recording by a high band VTR. Therefore, in a preferred embodiment of the present invention, the high band VTR is provided with a function of discriminating a magnetic tape so that the high band recording may not accidentally be made on a convenional magnetic tape when a cassette containing the conventional magnetic tape is inserted in the high band VTR.

Figure 12A:
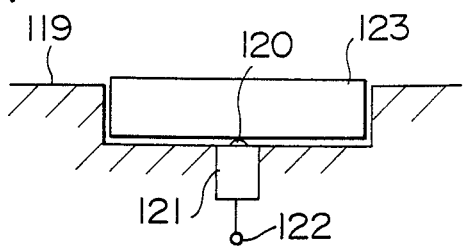
FIGS. 12A and 12B are schematic sectional views of a mechanism provided in the VTR of the present invention for discriminating between a cassette containing a conventional magnetic tape and a cassette containing a high band magnetic tape.
Figure 12B:
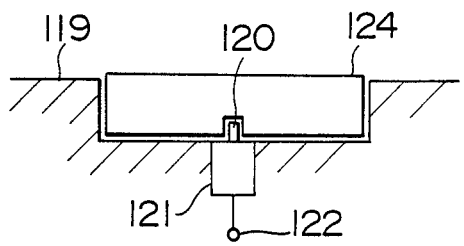

For example, for the purpose of magnetic tape discrimination, the upper or lower half of a cassette containing a high-band recording magnetic tape is provided with a configurational feature such as a hole, a groove or a projection which is not provided on a cassette containing a conventional magnetic tape. The high band VTR is provided with a mechanism for detecting such a feature, so that whether a cassette inserted in the high band VTR contains a high-band recording magnetic tape or a conventional magnetic tape is decided by detecting the presence or absence of the configurational feature. As an example of the configurational feature, FIGS. 12A and 12B show that a hole is provided on the lower half of a cassette containing a high-band recording magnetic tape. FIG. 12A is a schematic sectional view of the mechanism when a conventional tape cassette 123 is inserted in the body 119 of the high band VTR, and FIG. 12B is a schematic sectional view of the mechanism when a high-band tape cassette 124 is inserted in the body 119 of the high band VTR.

A magnetic tape discriminating unit 121 is provided with a movable projection 120 for detecting the presence or absence of the hole on the cassette half. In the case of FIG. 12A, the movable projection 120 is urged into the body of the magnetic tape discriminating unit 121 due to the absence of the hole on the cassette half, and a signal indicating that the inserted cassette 123 contains a conventional magnetic tape appears at an output terminal 122. On the other hand, in the case of FIG. 12B, the movable projection 120 is received in the hole of the high-band tape cassette 124 and is not urged into the body of the magnetic tape discriminating unit 121, and a signal indicating that the inserted cassette 124 contains a high-band magnetic tape appears at the output terminal 122.

Thus, the kind of the magnetic tape inserted in the high band VTR is automatically identified, and the high band recording is executed when the high-band recording magnetic tape is inserted, while the conventional recording is executed when the conventional magnetic tape is inserted. A manual switch permitting selection of either the high band recording or the conventional recording is provided on the high band VTR, so that the conventional recording can also be made on the high-band magnetic tape when so desired by the user. On the other hand, a conventional VTR which is not capable of high band recording carries out the conventional recording regardless of the kind of the magnetic tape. Thus, in the record mode, a video signal is recorded in five different ways depending on the combination of the magnetic tape, VTR and recording method, as shown in FIG. 11.

In the playback mode, the magnetic tapes having the video signal recorded in the five different ways described above are reproduced by the high band VTR or by the conventional VTR. Depending on the combination of the magnetic tape and reproducing VTR, the results of reproduction are classified into ten different kinds as shown in FIG. 11.

In the playback mode, the conventional VTR reproduces the recorded video signal from the magnetic tape irrespective of whether the video signal was recorded on the high-band magnetic tape or the conventional magnetic tape. However, in the case of the high band VTR, change-over between high band reproduction and conventional reproduction is required depending on whether the video signal was recorded on the high-band magnetic tape or the conventional magnetic tape. For this purpose, a circuit having a function for discriminating the recording characteristics is required. Two forms of such a recording characteristics discriminating circuit are shown in FIGS. 13A and 13B respectively.

Figure 13A:
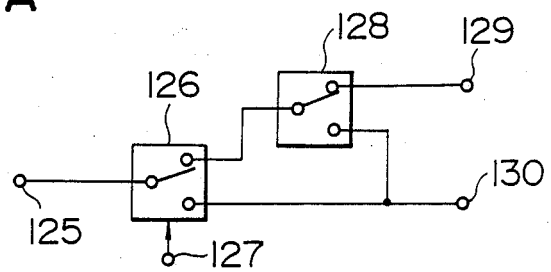
FIGS. 13A and 13B are circuit diagrams of part of two forms of the recording signal processing circuit included in the recording system used in the VTR of the present invention.

In the form shown in FIG. 13A, the tape discriminating unit 121 provided in the recording system is utilized so as to simplify the structure of the recording characteristics discriminating circuit. Referring to FIG. 13A, the output signal of the tape discriminating unit 121 is applied to an input terminal 127 to change over a switch 126 thereby distributing a reproduced FM luminance signal applied to the switch 126 from an input terminal 125. That is, when the output signal of the tape discriminating unit 121 indicates that the magnetic tape is of the high band type, the reproduced FM luminance signal is applied to a switch 128 through the switch 126. The switch 128 is a manual switch which is manipulated by the user who judges the recording method while looking at the reproduced picture and changes over between the high band reproduction and the conventional reproduction. When the recording method is the high band recording method, the reproduced FM luminance signal is applied to an output terminal 129 through the switch 128, while when the recording method is the conventional recording method, the reproduced FM luminance signal is applied to an output terminal 130 through the switch 128. In the case of the conventional magnetic tape on which the video signal is recorded according to the conventional recording method only, the reproduced FM luminance signal is directly applied to the output terminal 130 from the switch 126.

Figure 13B:
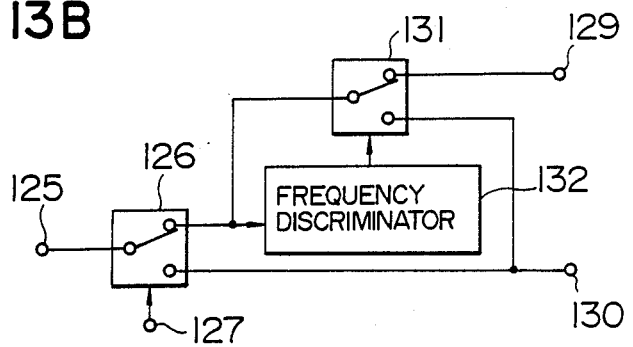

FIG. 13B shows a modification of the circuit shown in FIG. 13A. Referring to FIG. 13B, a reproduced FM luminance signal applied to the input terminal 125 is distributed by the switch 126 which is changed over according to the output signal of the tape discriminating unit 121 applied to the input terminal 127. Only when the magnetic tape is of the high band type, the reproduced FM luminance signal is applied to both of an automatic switch 131 and a frequency discriminator 132. When the reproduced FM luminance signal was recorded according to the high band recording method, the signal is distributed to the output terminal 129, while when the signal was recorded according to the conventional recording method, the signal is distributed to the output terminal 130. The frequency discriminator 132 is equivalent to the discriminating circuit 12 or the combination of the FMAGC 26 and the discriminating circuit 12 shown in FIG. 6.

In the manner described above, whether a video signal was recorded by the high band VTR on a high band magnetic tape or a conventional magnetic tape according to the high band recording method or the conventional recording method is identified, and the recorded signal is reproduced in a way comforming to the characteristics of signal recording. Therefore, the high band VTR can deal with all of the five ways of recording. On the other hand, reproduction of a video signal recorded according to the high band recording method is impossible in the case of the conventional VTR. Therefore, the conventional VTR cannot reproduce a video signal recorded on a high band magnetic tape by the high band VTR according to the high band recording method. However, the conventional VTR can reproduce video signals recorded according to the remaining four ways of recording, since all of such video signals are recorded according to the conventional recording method. It will thus be seen that the VTR according to the present invention can participate in all the ways of recording and reproduction shown in FIG. 11, and the one-way compatibility of the VTR of the present invention with the conventional VTR and conventional magnetic tape can be secured.

Another form of the recording system preferably used in the VTR of the present invention will be described with reference to FIG. 14. The illustrated recording system includes the recording characteristics discriminating circuit shown in FIG. 13A.

Figure 14:
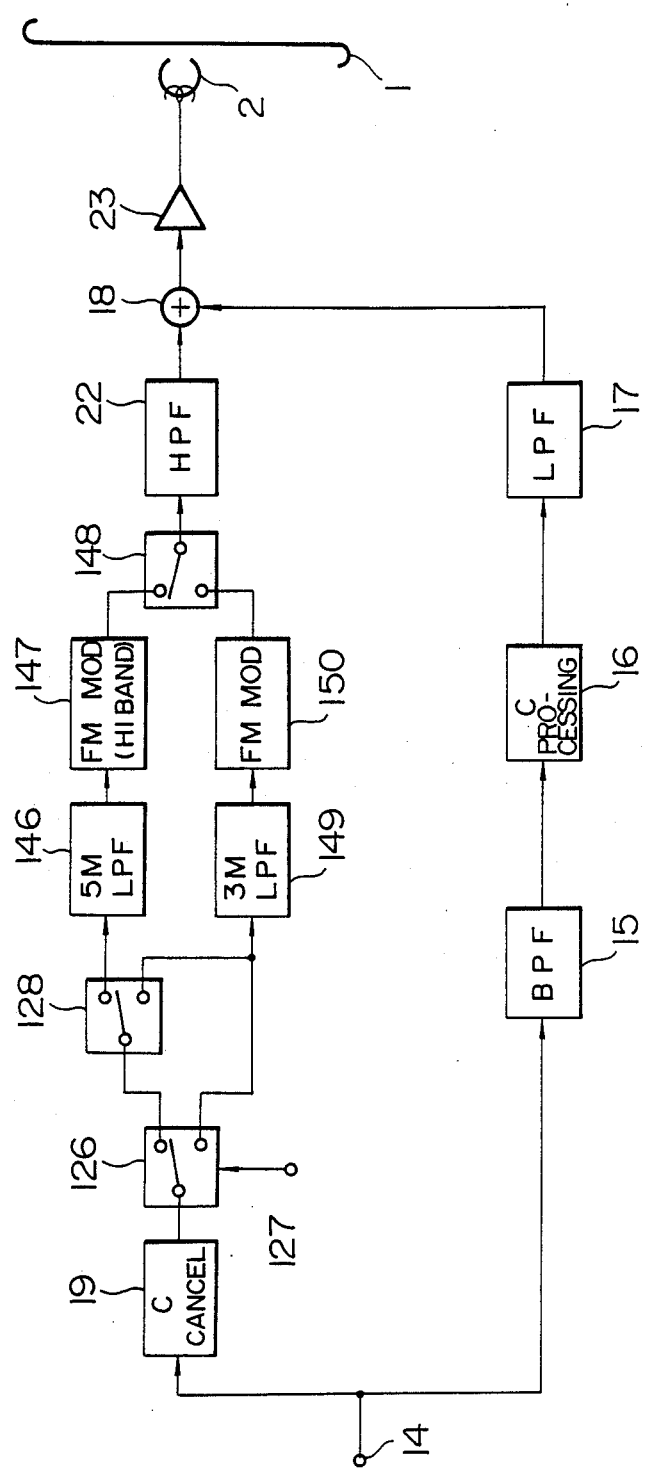
FIG. 14 is a block diagram showing the structure of another form of the recording system used in the VTR of the present invention.

Referring to FIG. 14, an NTSC video signal is applied from the input terminal 14 to the C signal cancelling circuit 19 where its C signal is cancelled, and its Y signal only is extracted. The extracted Y signal is applied to the switch 126. The output signal of the aforementioned tape discriminating unit 121 is applied to the terminal 127 of the switch 126 to change over the switch 126, and the Y signal is applied through the switch 126 to the switch 128 when the magnetic tape is of the high band type. The switch 128 is the manual switch which is changed over by the user depending on whether he selects the high band recording method or the conventional recording method. It is apparent that the switch 128 is more preferably replaced by the automatic switch 131 shown in FIG. 13B.

When the video signal is to be recorded according to the high band recording method, the Y signal is applied through a high-band recording LPF 146 and an FM modulator 147 to a switch 148. On the other hand, when the conventional recording method is selected by the switch 128, the Y signal is applied through a conventional recording LPF 149 and an FM modulator 150 to the switch 148. Further, when a cassette containing a conventional magnetic tape is inserted in the high band VTR, the Y signal from the switch 126 is also applied through the conventional recording LPF 149 to the FM modulator 150 to be converted into an FM Y signal in the usual manner. In the case of the high band recording, the switch 148 is connected in the position shown in FIG. 14, while in the case of the conventional recording, the switch 148 is connected in the other position. The FM luminance signal is then applied to the HPF 22. The remaining circuit structure is the same as that shown in FIG. 3.

It will be understood from the foregoing detailed description of the VTR of the present invention that, in the playback mode reproducing a video signal recorded according to the conventional recording method or high band recording method, the reproduced FM signal before being applied to a luminance signal processing circuit whose operating characteristic is changed over depending on the recording method is used to automatically discriminate the recording method, so that the recording method can be reliably identified without being affected by the factors including the characteristic of the circuit in a starting stage of reproducing operation.

Further, when the reproduced FM signal after having been passed through an FMAGC circuit is used for discriminating the recording method, the recording method can be reliably identified regardless of possible variations in the level of the FM signal reproduced by a magnetic head from a magnetic tape. Further, when a reference signal such as a head-drum rotation phase signal (SW30 signal) is used to determine the timing of discrimination, the recording method can be reliably identified even in a special playback mode.

In the high band VTR of the present invention, a high-band recording magnetic tape having an excellent short wavelength recording characteristic is used to record a video signal according to the high band recording method, and a circuit discriminating between a high band magnetic tape and a conventional magnetic tape is provided. Also, a select switch is provided to select the recording method, and a circuit discriminating as to whether the reproduced signal was recorded according to the high band recording method or the conventional recording method is provided. Therefore, the high band VTR has the one-way compatibility with a conventional VTR, and the recording mode can be selected without fail and automatically identified.

The combination of the tape discriminating circuit and a frequency discriminator permits automatic discrimination as to whether the reproduced signal was recorded according to the high band recording method or the conventional recording method. Also, the high band recording can be selected only when a high band magnetic tape is used for recording a video signal. Therefore, such a trouble that a video signal is recorded on a conventional magnetic tape according to the high band recording method by mistake can be reliably prevented.

We claim:

1. A magnetic recording and reproducing apparatus including a recording system operable with a first and a second recording mode converting a luminance signal of a video signal into an FM luminance signal having a first and a second carrier frequency respectively and recording the FM luminance signal on a magnetic recording medium, and a reproducing system reproducing the FM luminance signal recorded on the magnetic recording medium, said apparatus comprising:
    discriminating means disposed in said reproducing system for receiving said FM luminance signal reproduced from said magnetic recording medium and discriminating as to whether said reproduced FM luminance signal was recorded according to said first recording mode or said second recording mode;
    first signal processing means disposed in said reproducing system for processing said reproduced FM luminance signal recorded according to said first recording mode;
    second signal processing means disposed in said reproducing system for processing said FM luminance signal recorded according to said second recording mode; and
    control means responsive to an output of said discriminating means to control application of said reproduced FM luminance signal to one of said first and second signal processing means.

2. A magnetic recording and reproducing apparatus according to claim 1, wherein said discriminating means is disposed in a succeeding stage of means disposed in said reproducing system for automatically controlling the gain of said reproduced FM luminance signal.

3. A magnetic recording and reproducing apparatus according to claim 1, further comprising means for detecting the rotation phase of a rotary head drum, wherein the discriminating timing of said discriminating means is set at a specific position in one field of the video signal, on the basis of the rotation phase of the head drum detected by said detecting means.

4. A magnetic recording and reproducing apparatus including a recording system operable with a first recording mode converting a luminance signal of a video signal into an FM luminance signal having a predetermined carrier frequency and recording the FM luminance signal on a magnetic tape and a second recording mode converting the luminance signal of the video signal into an FM luminance signal having a carrier frequency higher than that of the FM luminance signal recorded according to the first recording mode and recording the FM luminance signal on the magnetic tape, and a reproducing system reproducing the FM luminance signal recorded on the magnetic tape according to one of the first and second recording modes, said apparatus comprising:
    means for detecting a specific configurational feature of a cassette containing a magnetic tape used for recording according to said second recording mode;
    means disposed in said recording system for selecting one of said first and second recording modes;
    means disposed in said reproducing system for discriminating, on the basis of the frequency the FM luminance signal reproduced from said magnetic tape, as to whether said reproduced FM luminance signal was recorded according to said first recording mode or said second recording mode; and
    means responding to the outputs of said feature detecting means and said frequency discriminating means for processing said reproduced FM luminance signal with a characteristic corresponding to said first recording mode or said second recording mode.

5. A magnetic recording and reproducing apparatus according to claim 4, wherein, when said feature detecting means does not detect said specific configurational feature of said tape cassette, said FM luminance signal is recorded according to said first recording mode.

6. A magnetic recording and reproducing apparatus according to claim 4, wherein, when said feature detecting means does not detect said specific configurational feature of said tape cassette, said signal processing means processes said reproduced FM luminance signal with the characteristic corresponding to said first recording mode.

7. A magnetic recoring and reproducing apparatus according to claim 4, wherein said discriminating means includes first band-pass filter means permitting passage of the carrier frequency of said FM luminance signal recorded according to said first recording mode, second band-pass filter means disposed in parallel with said first band-pass filter means and permitting passage of the carrier frequency of said FM luminance signal recorded according to said second recording mode, and means for comparing the levels of the outputs of said two band-pass filter means.

8. A magnetic recording and reproducing apparatus including a first recording circuit operable with a first recording mode converting a luminance signal of a video signal into an FM luminance signal having a predetermined carrier frequency and recording the FM luminance signal on a magnetic tape, a second recording circuit operable with a second recording mode converting the luminance signal of the video signal into an FM luminance signal having a carrier frequency higher than that of the FM luminance signal recorded according to the first recording mode and recording the FM luminance signal on the magnetic tape, a first reproducing circuit reproducing the FM luminance signal recorded according to the first recording mode, and a second reproducing circuit reproducing the FM luminance signal recorded according to the second recording mode, said apparatus comprising:

discriminating means receiving said reproduced FM luminance signal for discriminating, on the basis of the frequency of said reproduced FM luminance signal, as to whether said reproduced FM luminance signal was recorded according to said first recording mode or said second recording mode; and selecting means responsive to the output of said discriminating means for selectively distributing said FM luminance signal to said first reproducing circuit or said second reproducing circuit.

9. A magnetic recording and reproducing apparatus according to claim 8, further comprising means for detecting as to whether a cassette containing said magnetic tape is adapted to be exclusively used for recording according to said second recording mode.

10. A magnetic recording and reproducing apparatus according to claim 9, wherein, when said detecting means detects that said cassette is not adapted to be exclusively used for recording according to said second recording mode, said selecting means distributes said FM luminance signal to said first reproducing circuit.

* * * * *